United States Patent
Narisawa et al.

Patent Number: 6,114,446
Date of Patent: Sep. 5, 2000

[54] POLYMER COMPOSITION CAPABLE OF FORMING SURFACE SLIDABLE ON WATER

[75] Inventors: Ikuo Narisawa, 14-8, Tohrimachi 6-chome, Yonezawa-shi, Yamagata 992-0025, Japan; Makoto Takeishi, Yonezawa; Heihachi Murase, Oiso-machi, both of Japan

[73] Assignees: Kansai Paint Co., Ltd., Hyogo; Ikuo Narisawa, Yamagata, both of Japan

[21] Appl. No.: 09/331,760

[22] PCT Filed: Dec. 22, 1997

[86] PCT No.: PCT/JP97/04739

§ 371 Date: Jun. 25, 1999

§ 102(e) Date: Jun. 25, 1999

[87] PCT Pub. No.: WO98/29505

PCT Pub. Date: Jul. 9, 1998

[30] Foreign Application Priority Data

Dec. 25, 1996 [JP] Japan .................................... 8-359885
Sep. 2, 1997 [JP] Japan .................................... 9-277911

[51] Int. Cl.$^7$ .................................................. C08F 14/18
[52] U.S. Cl. ............................ 525/102; 528/25; 428/421
[58] Field of Search .............................. 525/102; 528/25; 428/421

[56] References Cited

U.S. PATENT DOCUMENTS

| | | | |
|---|---|---|---|
| 5,035,934 | 7/1991 | Tomiyama et al. | 428/40 |
| 5,621,042 | 4/1997 | Hanada et al. | 525/102 |

FOREIGN PATENT DOCUMENTS

| | | |
|---|---|---|
| 0 491 357 | 6/1992 | European Pat. Off. . |
| 0 735 118 | 10/1996 | European Pat. Off. . |
| 39 38 963 | 5/1990 | Germany . |
| 2-251555 | 10/1990 | Japan . |
| 3-182539 | 8/1991 | Japan . |
| 5-230161 | 9/1993 | Japan . |
| 5-320578 | 12/1993 | Japan . |
| 8-113696 | 5/1996 | Japan . |

*Primary Examiner*—Margaret G. Moore
*Attorney, Agent, or Firm*—Wenderoth, Lind & Ponack, L.L.P.

[57] ABSTRACT

The present invention relates to a polymer composition capable of forming a super-hydrophobic surface which is difficult to be wetted with water and from which an adhered waterdrop can easily slide down comprising (A) a reaction product formed by a reaction of
  (a) a hydroxyl group-containing fluoropolymer obtained by copolymerizing a fluoroolefin, a hydroxyl group-containing vinyl monomer and another unsaturated monomer capable of copolymerizing with them,
  (b) an epoxy-terminated siloxane polymer represented by the formula

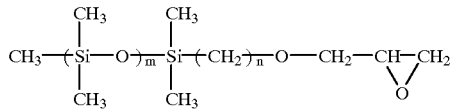

wherein m is a number of 6–300 and n is a number of 0–6, at the equivalent ratio of the hydroxyl groups of the fluoropolymer (a) to the epoxy groups of the siloxane polymer (b) of 1/0.05 to 1/0.8, in the presence of
  (c) a sulphonic acid compound, and
(B) a polyisocyanate compound, which may be blocked, or a melamine type crosslinking agent.

14 Claims, No Drawings

POLYMER COMPOSITION CAPABLE OF FORMING SURFACE SLIDABLE ON WATER

TECHNICAL FIELD

The present invention relates to a polymer composition capable of forming a super-hydrophobic surface which is difficult to be wetted with water and from which an adhered waterdrop can easily slide down.

BACKGROUND ART

So far it has been practiced to coat the surface of an object with hydrophobic materials such as silicon type compound or resin, fluorine-containing resin, polyolefin resin etc. in order to make the surface of an object difficult to be wetted, namely, to give a water-repellant property to the surface of an object. When water adheres to the surface of an object, which has been thus treated to make the surface hydrophobic, water is rejected to form a spherical waterdrop. While big waterdrops fall by their own weight, small waterdrops stay adhered strongly to the surface of the object and often do not fall even the adhered surface is leant vertically. In such a case a dry surface without waterdrops can be obtained only the adhered waterdrops is removed forcibly by a mechanical way such as wiping out.

Therefore, various development studies of highly hydrophobic materials have been conducted to make an adhered waterdrop as closely as possible to a sphere by making the hydrophobicity of the surface of an object as high as possible and increase the contact angle with water and thus to roll down the waterdrops from the surface of an object. Furthermore, physical methods such as making the surface rough or forming thin hairs on the surface are being studied. However, the materials so far proposed to make the contact angle with water big have problems such as being inferior in mechanical properties such as hardness, strength etc. or very special substances whose production is difficult. Moreover, in case of physical methods such as making the surface rough or forming thin hairs, there is problems that their effect lessen when the surface of an object is rubbed once.

Therefore, a development of coating material, which gives a water-repellant property to the surface of an object and at the same time can easily remove the adhered waterdrops sliding down from the surface of the object, is strongly desired.

The present inventors have largely changed the direction from the conventional idea of making the contact angle of the adhered waterdrop as big as possible and making the waterdrop as spherical as possible so that it easily rolls down from the surface of an object, and have been intensively studying to develop a material capable of forming a water-slidable surface from which a waterdrop easily slides down by its own weight, although the contact angle of the adhered waterdrop is not so big.

As a result, they found that a film formed by crosslinking and curing the reaction product, obtained by previously reacting a hydroxyl group-containing fluoropolymer with a certain kind of epoxy-terminated siloxane polymer in the presence of a sulphonic acid compound, with a crosslinking agent meets the above mentioned purpose and completed the present invention.

DISCLOSURE OF INVENTION

Thus according to the present invention there is provided a polymer composition capable of forming a water-slidable surface characterized by comprising (A) a reaction product formed by a reaction of
 (a) a hydroxyl group-containing fluoropolymer obtained by copolymerizing a fluoroolefin, a hydroxyl group-containing vinyl monomer and another unsaturated monomer capable of coploymerizing with them,
 (b) an epoxy-terminated siloxane polymer represented by the formula

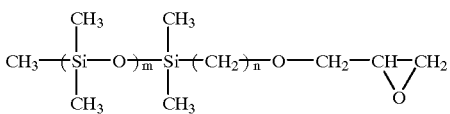

wherein m is a number of 6–300 and n is a number of 0–6, at the equivalent ratio of the hydroxyl group of the fluoropolymer (a) to the epoxy group of the siloxane polymer (b) of 1/0.05 to 1/0.8, in the presence of
 (c) a sulphonic acid compound, and
(B) a polyisocyanate compound, which may be blocked, or a melamine type crosslinking agent.

The polymer composition of the present invention is described hereinafter in more detail.

Hydroxyl Group-containing Fluoropolymer (a)

The hydroxyl group-containing fluoropolymer (a) used for the preparation of the reaction product (A) in the present invention is obtained by a copolymerization of a fluoroolefin, a hydroxyl group-containing vinyl monomer and another unsaturated monomer capable of coploymerizing with them.

The fluoroolefin usable for the preparation of the above-mentioned fluoropolymer (a) is an olefin in which at least one hydrogen atom bonded to its carbon chain is substituted with a fluorine atom and optionally at least one of the remaining hydrogen atoms may be substituted with a chlorine atom and includes specifically, for example, hexafluoropropene, tetrafluoroethylene, monochlorotrifluoroethylene, dichlorodifluoroethylene, 1,2-difluoroethylene, vinylidene fluoride, monofluoroethylene etc. Among them, tetrafluoroethylene and monochlorotrifluoroethylene are particularly preferable in view of copolymerizability.

As the hydroxyl group-containing vinyl monomer to be coplymerized with the above-mentioned fluoroolefin, there can be mentioned, for example, hydroxyl group-containing vinyl ethers such as hydroxyethyl vinyl ether, hydroxypropyl vinyl ether, hydroxybutyl vinyl ether, hydroxyhexyl vinyl ether, hydroxypentyl vinyl ether; $C_2$–$C_2$-alkyl esters of (meth)acrylic acid, such as, 2-hydroxyethyl acrylate, 2-hydroxyethyl methacrylate, hydroxypropyl acrylate, hydroxypropyl methacrylate, hydroxybutyl acrylate, hydroxybutyl methacrylate etc.

Among them, hydroxyl group-containing vinyl ethers, above all, vinyl ethers having a $C_2$–$C_6$ -hydroxyalkyl ether group, are particularly preferable in view of copolymerizability.

Further, as the other unsaturated monomer to be coplymerized with the above-mentioned fluoroolefin and hydroxyl group-containing vinyl monomer, there can be mentioned, for example, vinyl ethers having an alkyl group such as methyl, ethyl, propyl, isobutyl, n-butyl, hexyl, octyl, decyl, lauryl etc. or an alicyclic group such as cyclobutyl, cyclopentyl, cyclohexyl, adamantyl, bornyl etc.; aromatic vinyl monomers such as styrene, α-methylstyrene etc.; alkyl (meth)acrylates having a $C_1$–$C_{18}$-alkyl group; glycidyl (meth)acrylate; vinyl esters such as vinyl acetate, vinyl propionate, vinyl butyrate, vinyl pivalate, vinyl caproate, vinyl laurate, vinyl neodecanoate, vinyl cyclohexanecarboxylate etc.; α-olefins such as ethylene, propylene, isobutylene, butene-1 etc. Among them, vinyl ethers having a $C_2$–$C_6$-alkyl ether group, for example, ethyl vinyl ether and cyclohexyl vinyl ether, are particularly preferable in view of copolymerizability.

The ratios of copolymerization of the above-mentioned fluoroolefin, hydroxyl group-containing vinyl monomer and other copolymerizable unsaturated monomer can be varied in a wide range according to the desired properties of the fluoropolymer to be obtained etc. Desirable ratios are generally in the following ranges based upon the total amount of the above-mentioned three components:

Fluoroolefin:
    20–80 mol %, particularly 25–75 mol %,
Hydroxyl group-containing vinyl monomer:
    1–80 mol %, particularly 5–75 mol %,
Other copolymerizable unsaturated monomer:
    1–79 mol %, particularly 5–70 mol %.

The copolymerization of the above-mentioned three kinds of monomers can be conducted by reacting them usually in an organic solvent in the presence of about 0.01 to about 5 parts by weight of a polymerization initiator per 100 parts by weight of the total monomers at a temperature of about –20° C. to about 150° C. under the normal pressure or optionally under an elevated pressure up to about 30 kg/cm$^2$G.

As a fluoropolymer (a) there can be used also a modified copolymer obtained by further reacting the copolymer obtained as mentioned above with a dibasic acid anhydride to introduce carboxyl groups to a part of the hydroxyl groups of the copolymer.

The fluoropolymer (a) thus obtained can have a number average molecular weight in the range of generally 2,000–100,000, preferably 5,000–60,000. Further, the fluoropolymer (a) can have a hydroxyl value in the range of generally 30–400 mgKOH/g, preferably 40–300 mgKOH/g.

As the fluoropolymer (a) used in the present invention, above all, the copolymer of monochlorotrifluoroethylene, 4-hydroxybutyl vinyl ether and ethyl vinyl ether is preferable.

Epoxy-terminated Siloxane Polymer (b)

The epoxy-terminated siloxane polymer (b) used in the present invention is represented the following formula

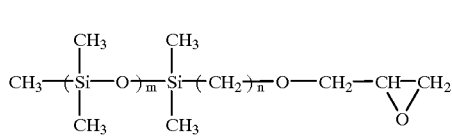

(I)

wherein m means an average degree of polymerization of the dimethylsiloxane unit and is a number in the range of 6–300, preferably 6–100 and n is a number in the range of 0–6, preferably 1–5.

The siloxane polymer (b) can have a number average molecular weight in the range of generally 300–30,000, preferably 500–20,000.

Sulphonic Acid Compound (c)

The sulphonic acid compound (c) used in the present invention is represented by the following formula

R—SO$_3$H     (II)

wherein R represents an organic residual group, for example, an aliphatic hydrocarbon group, aromatic hydrocarbon group etc. and said aliphatic hydrocarbon group and aromatic hydrocarbon group may be optionally substituted with a halogen atom etc. and specifically includes methanesulphonic acid, trifluoromethanesulphonic acid, benzenesulphonic acid, p-toluenesulphonic acid, 2,4- or 2,5-dimethylbenzenesulphonic acid, naphthalene-α or β-sulphonic acid, etc. Above all, methanesulphonic acid is preferable.

Reaction Product (A)

In the present invention the above-mentioned fluoropolymer (a) and siloxane polymer (b) are previously reacted in the presence of a sulphonic acid compound (c). In the reaction it is estimated that a part of the siloxane polymer (b) is grafted to the fluoropolymer (a) in the presence of the sulphonic acid compound (c) as an acid catalyst and at least one part of the remaining siloxane polymer (b) is bound to the sulphonic acid compound.

Thus the reaction product (A) formed by the above-mentioned reaction contains a grafted product of fluoropolymer (a) with siloxane polymer (b), a bonded product of siloxane polymer (b) and sulphonic acid compound (c), unreacted fluoropolymer (a) and/or siloxane polymer (b) etc.

The reaction product (A) may contain unreacted sulphonic acid compound but desirably do not substantially contain unreacted sulphonic acid compound.

Therefore it is desirable to conduct the above-mentioned reaction under such a condition that no unreacted sulphonic acid compound would remain and the fluoropolymer (a) and the siloxane polymer (b) are used in such a proportion that the equivalent ratio of the hydroxyl groups of the fluoropolymer (a) and the epoxy groups of the siloxane polymer (b) would be in the range of 1/0.05 to 1/0.8, preferably 1/0.1 to 1/0.5, more preferably 1/0.1 to 1/0.45. The sulphonic acid compound (c) can be used in the range of generally 0.1–0.5 mol, preferably 0.1–0.4, more preferably 0.2–0.4 per 1 mol of the siloxane polymer (b).

The above-mentioned reaction can be conducted usually by dissolving the fluoropolymer (a) and the sulphonic acid compound in an organic solvent, for example, toluene, xylene etc., then adding the siloxane polymer (b) to the resulting solution and by heating the mixture to the temperature of about 60 to about 150° C.

The reaction product thus obtained can be mixed with a crosslinking component (B) to be described later either as such or appropriately adjusting the solid content concentration by adding a solvent or partially removing it, or after removing the unreacted sulphonic acid compound in case of containing it, to form the polymer composition of the present invention.

Crosslinking Component (B)

In the present invention a polyisocyanate compound, which may be blocked, or a melamine type crosslinking agent is used as a crosslinking agent in order to crosslink and cure the above-mentioned reaction product (A).

As the above-mentioned polyisocyanate compound there can be mentioned, for example, aromatic, alicyclic or aliphatic polyisocyanate compounds such as tolylene diisocyanate, xylylene diisocyanate, phenylene diisocyanate, bis(isocyanatomethyl)cyclohexane, tetramethylene diisocyanate, hexamethylene diisocyanate, isophorone diisocyanate, hydrogenated diphenylmethane diisocyanate, diphenylmethane diisocyanate etc. and isocyanate-terminated prepolymers obtained by reacting an excess amount of these polyisocyanate compounds with a low molecular active hydrogen-containing compound such as ethylene glycol, propylene glycol, trimethylolpropane, hexanetriol, castor oil etc.

These polyisocyanate compounds can be used as such or in a blocked form in which the isocyanate group is blocked by a blocking agent as necessary.

As the isocyanate-blocking agent there can be mentioned, phenols such as phenol, m-cresol, xylenol, thiophenol etc.; alcohols such as methanol, ethanol, butanol, 2-ethylhexanol, cyclohexanol, ethylene glycol monomethyl ether etc.; active hydrogen-containing compounds such as caprolactam, ethyl acetacetate, diethyl malonate etc. The blocking of the polyisocyanate compounds using these blocking agents can be conducted according to per se known processes.

As a melamine type crosslinking agent there can be used partially methylolized or completely methylolized melamine resin consisting of melamine having 1–5 triazine rings or its condensate and having a molecular weight in the range of 300–3,000, particularly 500–2,000, or partially alkyl etherified or completely alkyl etherifified methylolmelamine resin obtained by etherifying a part or the total of the methylol groups with a $C_1$–$C_8$ monohydric alcohol, for example, methanol, ethanol, propanol, butanol etc.

Polymer Composition According to the Present Invention

The polymer composition according to the present invention can be prepared by mixing the above-mentioned reaction product (A), crosslinking component (B) and suitably adding an organic solvent.

In case of using as the crosslinking component (B) a free polyisocyanate compound or a partially methylolized or completely methylolized melamine resin, which reacts with the reaction product (A) relatively easily, it is desirable to make the polymer composition in 2-solution type in which the component (A) and the component (B) are separated and to mix both components immediately before use.

The mixing ratio of the crosslinking component (B) to the reaction product (A) can be varied in a wide range according to the kind of the crosslinking component (B) etc. It is appropriate, however, to use the crosslinking component (B) as the solid content in the range of 4–100 parts by weight, preferably 4–80 parts by weight, more preferably 4–60 parts by weight per 100 parts of the solid content of the reaction product (A).

In the polymer composition of the present invention there can be further mixed, as necessary, for example, color pigment, filler, rust preventive pigment, dyestuff, surface-active agent and other per se known additives which are usually used for a paint.

The polymer composition of the present invention thus obtained can give a formed article (here a formed article includes a formed article in the form of a film coated on a substrate) having a highly water-slidable surface, for example, by being cured by crosslinking after being poured into an appropriate mold or formed into a film by being coated on the surface of an appropriate substrate.

The polymer composition of the present invention is useful particularly as a coating composition to apply on the surface of a substrate such as glass (for example, front glass and window glass of a car, window glass, mirror etc.), metal (for example, automobile, car, aluminium fin, traffic sign board, microwave antenna, large water pipe, traffic signal etc.), plastics (film or sheet for horticulture, artificial organ, stool, washbasin etc.), inorganic materials (stool, bathtub, tile etc.), wood etc.

The coating of the polymer composition of the present invention on these substrates can be conducted by a per se method, for example, spray coating, brush coating, roller coating, roll coating, immersion coating, curtain flow coater coating etc.

The thickness of a coating film can be varied according to the application of the substrate etc. and is preferable generally about 1–100 μm, particularty about 10–50 μm as the film tickness after curing.

The condition of crosslink-curing of the polymer composition of the present invention is determined according to the kinds of the reaction product (A) and the crosslinking component (B) used for the preparation of said composition. Usually there can be used conditions of a temperature of the normal temperature to about 300° C., preferably 80–250° C. and for about 0.5 to about 40 minutes.

The surface of a formed article thus formed by using the polymer composition of the present invention is highly water-slidable. For example, a surface of an object coated with a conventional fluorinated ethylene type resin has a contact angle of about 108 degrees for water in the form of a waterdrop but a waterdrop of 10 mg stays and does not drop by its own weight, when the film with waterdrops is leant to 90 degrees. On the other hand, the film formed of the polymer composition of the present invention has a contact angle of a waterdrop in the range of about 65–85 degrees, which are not particularly big, but shows such an excellent water-slidability that a waterdrop of 10 mg, adhered to said film, starts sliding by its own weight and drops, when the film is leant only within 30 degrees from the horizontal plane. Moreover, a waterdrop of 10 mg adhered to the film formed of the polymer composition of the present invention can be moved and dropped sliding from the film, when said film is kept horizontally and blown by air at an air speed of 1 m/second or less.

Thus the polymer composition of the present invention is very useful as an agent for treatment of an object or a surface which would be disturbed by adhered waterdrops.

EXAMPLES

The present invention is hereinafter described more specifically by way of Examples. The present invention, however, is not restricted by these examples at all.

Example 1

In 100 ml of toluene 9.6 g (8 mmol) of "Silaplane FM-0511" (*1) and 36 g (20 mmol) of "Lumiflon LF-600" (*2) were dissolved. When the mixture had become uniform by stirring, 0.2 g (2 mmol) of methanesulphonic acid was added and the reaction was conducted at 120° C. for 1 hour to obtain a reaction product (A) after cooling. To 100 parts by weight (solid content) of the reaction product (A) 16 parts by weight (solid content) of "Takenate D-160N" (*3), a crosslinking component (B), was added and stirred to obtain a polymer composition.

(*1) "Silaplane FM-0511": epoxy group-containing reactive siloxane polymer, molecular weight: about 1,000, structural formula

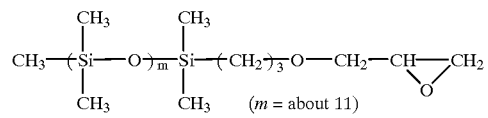

a product of Chisso Corporation.

(*2) "Lumiflon LF-600": hydroxy group-containing fluoropolymer, molecular weight: about 15,500, hydroxyl value: 31 mgKOH/g, solid content: 50% by weight, a product of Asahi Glass Co., Ltd.

(*3) "Takenate D-160N": hexamethylene diisocyanate-adduct of trimethylolpropane, solid content: 75% by weight, isocyanate content: 12.6% by weight, a product of Takeda Chemical Industries, Ltd.

Examples 2–8 and Comparative Examples 1–2

Polymer compositions were obtained by operating in the same manner as in Example 1, except using the compositions and reaction conditions shown in Table 1 below.

The polymer compositions obtained by the above-mentioned Examples 1–8 and Comparative Examples 1–2 were coated on a glass plate using No. 10 bar coater and and heated under the conditions for crosslinked coating film formation shown in Table 1 to obtain a cured film. For the films immediately after the formation and films after supersonic washing in deionized water for 10 minutes, the contact angles and the slide-down angles were measured by the method mentioned below. The results are shown in Table 1, too.

Contact Angle

Using a CA-X type contact angle meter made by Kyowa Interface Science Co., Ltd. about 10 mg of deionized water was dropped down on the film in the atmosphere of 23° C., 65% RH using a microsyringe and the angle between the film and the tangent to the waterdrop edge was measured within 1 minute after the dropping of the waterdrop.

Slide-down Angle

Using a CA-X type contact angle meter made by Kyowa Interface Science Co., Ltd. about 10 mg of deionized water was dropped down on the film in the atmosphere of 23° C., 65% RH using a microsyringe and the glass plate was slowly leant. The angle, at which the waterdrop starts sliding, was defined as the slide-down angle.

In Table 1
(*1) cf. Example 1.
(*2) cf. Example 1.
(*3) cf. Example 1.
(*4) Hexamethylene diisocyanate, isocyanate content 50% by weight.
(*5) "Burnock DN-990": a product of Dainippon Ink & Chemicals, Incorporated, isocyanurate type hexamethylene isocyanate, solid content 75% by weight, isocyanate content 13.0% by weight.
(*6) "U-Van 28-60": a product of Mitsui Chemicals, Inc., butylated methylolmelamine, solid content 60% by weight.
(*7) "Silaplane FM-0511" and methanesulphonic acid were mixed and stirred at 80° C. for 1 hour and then "Lumiflon LF-600" was added and refluxed at 120° C. for 1 hour.

What is claimed is:

1. A polymer composition capable of forming a water-slidable surface characterized by comprising
(A) a reaction product formed by a reaction of
(a) a hydroxyl group-containing fluoropolymer obtained by copolymerizing a fluoroolefin, a hydroxyl group-containing vinyl monomer and

TABLE 1

| | | | | Example | | | | | | | | Comparative Example | |
|---|---|---|---|---|---|---|---|---|---|---|---|---|---|
| | | | | 1 | 2 | 3 | 4 | 5 | 6 | 7 | 8 | 1 | 2 |
| Composition | Reaction product (A) | Component (a) | Kind | Lumiflon LF-600 (*2) | | | | | | | | | |
| | | | Amount (g) | 36 | | | | | | | | | |
| | | Component (b) | Kind | Silaplane FM-0511 (*1) | | | | | | | | | |
| | | | Amount (g) | 9.6 | 3.6 | 4.8 | 9.6 | 9.6 | 9.6 | 9.6 | 9.6 | 3.6 | 4.8 |
| | | Component (c) | Kind | Methanesulphonic acid | | | | | | | | | |
| | | | Amount (g) | 0.2 | 0.1 | 0.1 | 0.2 | 0.2 | 0.2 | 0.2 | 0.2 | 0.1 | 0.1 |
| | | Reaction solvent | Kind | Toluene | | | | | | | | — | — |
| | | | Amount (mL) | 100 | | | | | | | | — | — |
| | | (a)/(b) eq. ratio | | 1/0.4 | 1/0.15 | 1/0.2 | 1/0.4 | 1/0.4 | 1/0.4 | 1/0.4 | 1/0.4 | 1/0.15 | 1/0.15 |
| | | (a)/(b) mol ratio | | 1/0.25 | 1/0.33 | 1/0.25 | 1/0.25 | 1/0.25 | 1/0.25 | 1/0.25 | 1/0.25 | 1/0.33 | 1/0.25 |
| | | Reaction condition (° C. × Hr) | | | | | 120° C. × 1 hr | | | | | (*7) | |
| | Crosslinking component (B) | Kind | | Takenate D-160N (*3) | | | | (*4) | (*5) | (*6) | Takenate D-160N (*3) | | |
| | | Amount (g) | | 6 | 6 | 6 | 10 | 13 | 1.5 | 5.8 | 20 | 6 | 6 |
| (B) parts/(A) 100 parts (solid content ratio) | | | | 16 | 21 | 20 | 27 | 36 | 5 | 16 | 43 | 21 | 20 |
| Crosslinked film formation condition (° C. × Hr) | | | | | 100 × 0.5 | | | | 120 × 1 | 140 × 0.5 | 100 × 0.5 | | |
| Water slidable prop. | Contact angle (degree) | initial | | 71 | 75 | 75 | 68 | 71 | 71 | 76 | 82 | 74 | 73 |
| | | 10 min. after supersonic washing | | 73 | 84 | 83 | 70 | 70 | 73 | 77 | 87 | 81 | 81 |
| | Slide-down angle (degree) | initial | | 1 | 1 | 1 | 1 | 1 | 1 | 1 | 15 | 1 | 1 |
| | | 10 min. after supersonic washing | | 1 | 15 | 13 | 3 | 2 | 1 | 1 | 20 | 90 | 80 |

In Table 1
(*1) cf. Example 1.
(*2) cf. Example 1.
(*3) cf. Example 1.
(*4) Hexamethylene diisocyanate, isocyanate content 50% by weight.
(*5) "Burnock DN-990": a product of Dainippon Ink & Chemicals, Incorporated, isocyanurate type hexamethylene isocyanate, solid content 75% by weight, isocyanate content 13.0% by weight.
(*6) "U-Van 28-60": a product of Mitsui Chemicals, Inc., butylated methylolmelamine, solid content 60% by weight.
(*7) "Silaplane FM-0511" and methanesulphonic acid were mixed and stirred at 80° C. for 1 hour and then "Lumiflon LF-600" was added and refluxed at 120° C. for 1 hour.

another unsaturated monomer capable of coploymerizing with them, (b) an epoxy-terminated siloxane polymer represented by the formula

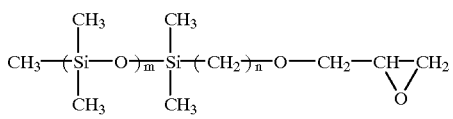

wherein m is a number of 6–300 and n is a number of 0–6, at the equivalent ratio of the hydroxyl group of the fluoropolymer (a) to the epoxy group of the siloxane polymer (b) of 1/0.05 to 1/0.8, in the presence of (c) a sulphonic acid compound, and (B) a polyisocyanate compound, which may be blocked, or a melamine type crosslinking agent.

2. The polymer composition set forth in claim 1 wherein the reaction product (A) does not substantially contain unreacted sulphonic acid compound.

3. The polymer composition set forth in claim 1 wherein the fluoropolymer (a) has a number average molecular weight of 2,000–100,000 and a hydroxyl value of 30–400 mgKOH.

4. The polymer composition set forth in claim 1 wherein the fluoropolymer (a) is a copolymer of monochlorotrifluoroethylene, 4-hydroxybutyl vinyl ether and ethyl vinyl ether.

5. The polymer composition set forth in claim 1 wherein the siloxane polymer (b) has a number average molecular weight of 300–30,000.

6. The polymer composition set forth in claim 1 wherein the equivalent ratio of the hydroxyl groups of the fluoropolymer (a) and the epoxy groups of the siloxane polymer (b) is 1/0.1 to 1/0.5.

7. The polymer composition set forth in claim 1 wherein the sulphonic acid compound (c) is methanesulphonic acid.

8. The polymer composition set forth in claim 1 containing a sulphonic acid compound (c) at the ratio of 0.1–0.5 moles per 1 mole of the siloxane polymer (b).

9. The polymer composition set forth in claim 1 comprising 4–100 parts by weight of the component (B) as solid content per 100 parts by weight of solid content of the component (A).

10. The polymer composition set forth in claim 1 capable of forming a film from which a waterdrop of 10 mg adhered to the surface starts sliding by its own weight at a leaning angle of less than 30 degrees from the horizontal plane.

11. The polymer composition set forth in claim 1 capable of forming a film from which a waterdrop of 10 mg adhered to the surface starts sliding by its own weight at a leaning angle of less than 30 degrees from the horizontal plane, after the film was washed supersonically in deionized water for 10 minutes.

12. A coating composition comprising the polymer composition set forth in claim 1.

13. A formed article with a water-slidable surface formed of the polymer composition set forth in claim 1.

14. The formed article set forth in claim 13 in the shape of a film.

* * * * *